United States Patent
Faherty

(10) Patent No.: US 6,701,993 B2
(45) Date of Patent: Mar. 9, 2004

(54) TRAY SEALING SYSTEM INCORPORATING BEADED SEAL PLATE

(75) Inventor: Vincent E. Faherty, Rayham, MA (US)

(73) Assignee: Harpak, Inc., Easton, MA (US)

( * ) Notice: Subject to any disclaimer, the term of this patent is extended or adjusted under 35 U.S.C. 154(b) by 0 days.

(21) Appl. No.: 09/995,083

(22) Filed: Nov. 27, 2001

(65) Prior Publication Data
US 2002/0074091 A1 Jun. 20, 2002

Related U.S. Application Data
(60) Provisional application No. 60/253,161, filed on Nov. 27, 2000.

(51) Int. Cl.[7] .............................................. B30B 15/00
(52) U.S. Cl. .......................... 156/581; 156/69; 156/381; 156/583.1
(58) Field of Search ........................ 156/69, 580, 580.1, 156/580.2, 581, 583.1, 381, 382; 53/290, 374.2

(56) References Cited

U.S. PATENT DOCUMENTS

| 4,167,092 A | * | 9/1979 | Medwed ........................ 53/373 |
| 4,948,441 A | * | 8/1990 | Peck ............................. 156/69 |
| 5,152,438 A | * | 10/1992 | Gordon et al. ............... 222/546 |
| 5,178,293 A | * | 1/1993 | Suzuki et al. ................ 220/359 |
| 5,316,603 A | * | 5/1994 | Akazawa et al. ............. 156/69 |

* cited by examiner

Primary Examiner—James Sells
(74) Attorney, Agent, or Firm—Wolf, Greenfield & Sacks, P.C.

(57) ABSTRACT

A tray sealing assembly includes a seal support frame for supporting a flange of a tray during sealing of a sealing film to the flange, a seal plate having a sealing surface provided with a raised bead, and a heater for heating the seal plate. The seal support frame is movable relative to the seal plate between a retracted position and a seal position in engagement with the seal plate. Preferably, the raised bead forms a continuous closed loop on the sealing surface. The raised bead produces a reliable seal between the sealing film and the tray flange, despite the presence of contaminants on the tray flange.

11 Claims, 5 Drawing Sheets

TRAY SEALING SYSTEM INCORPORATING BEADED SEAL PLATE

CROSS REFERENCE TO RELATED APPLICATION

This application claims the benefit of U.S. Provisional Application Ser. No. 60/253,161 filed Nov. 27, 2000, which is hereby incorporated by reference.

FIELD OF THE INVENTION

This invention relates to systems for sealing disposable trays that are used for packaging food products and, more particularly, to tray sealing systems which incorporate a beaded seal plate for producing a reliable seal between a sealing film and the tray.

BACKGROUND OF THE INVENTION

Disposable trays are commonly used for packaging meat and other food products for sale in supermarkets and other retail food outlets. Such trays are typically covered by a clear film to permit the product to be viewed. In one prior art approach, the tray is overwrapped with sealing film by packers in the retail food market. This approach does not provide an airtight seal, and the life of the product is limited. Furthermore, this approach requires additional labor at the retail outlet, and sanitary conditions cannot always be ensured.

Another more recent approach involves case-ready packaging by wholesalers, such as meat packers. A tray sealing system is used to produce an air-tight seal with an inert gas sealed within the package to prevent spoilage. The sealed tray containing a food product is ready for sale when it is delivered to the retail outlet.

The tray sealing systems may include a conveyor for supplying trays containing a food product to a sealing station. The sealing station typically includes a seal support frame for supporting a flange of the tray and a seal plate. The seal support frame is movable between a retracted position and a seal position. In the retracted position, a tray is moved into the seal support frame. In the seal position, the seal plate presses a sealing film into engagement with the flange of the tray. The seal plate is heated, causing the sealing film to be sealed to the flange of the tray.

Experience has shown that contamination of the tray flange is nearly impossible to avoid during packing of the tray with the food product. Such contamination may be liquid, solid, or both and is typically in the form of protein in the case of meat packaging. The contamination makes it difficult to produce an air-tight seal between the sealing film and the tray flange. Even if the tray is sealed initially, the seal may fail prematurely, causing potential leakage and product spoilage.

Accordingly, there is a need for tray sealing systems which overcome the difficulties associated with contamination of the tray flange during the sealing process.

SUMMARY OF THE INVENTION

According to a first aspect of the invention, a tray sealing assembly is provided. The tray sealing assembly comprises a seal support frame for supporting a flange of a tray during sealing of a sealing film to the flange, a seal plate having a sealing surface provided with a raised bead, and a heater for heating the seal plate. The seal support frame is movable relative to the seal plate between a retracted position and a seal position in engagement with the seal plate.

Preferably, the raised bead comprises a continuous closed loop on the sealing surface. The raised bead produces a reliable seal between the sealing film and the tray flange, despite the presence of contaminants on the tray flange.

The raised bead may comprise a single closed loop or two or more closed loops on the sealing surface. The raised bead may have a rounded cross section to avoid damage to the sealing film.

BRIEF DESCRIPTION OF THE DRAWINGS

For a better understanding of the invention, reference is made to the accompanying drawings, which are incorporated herein by reference and in which.

DETAILED DESCRIPTION

Figure 1:
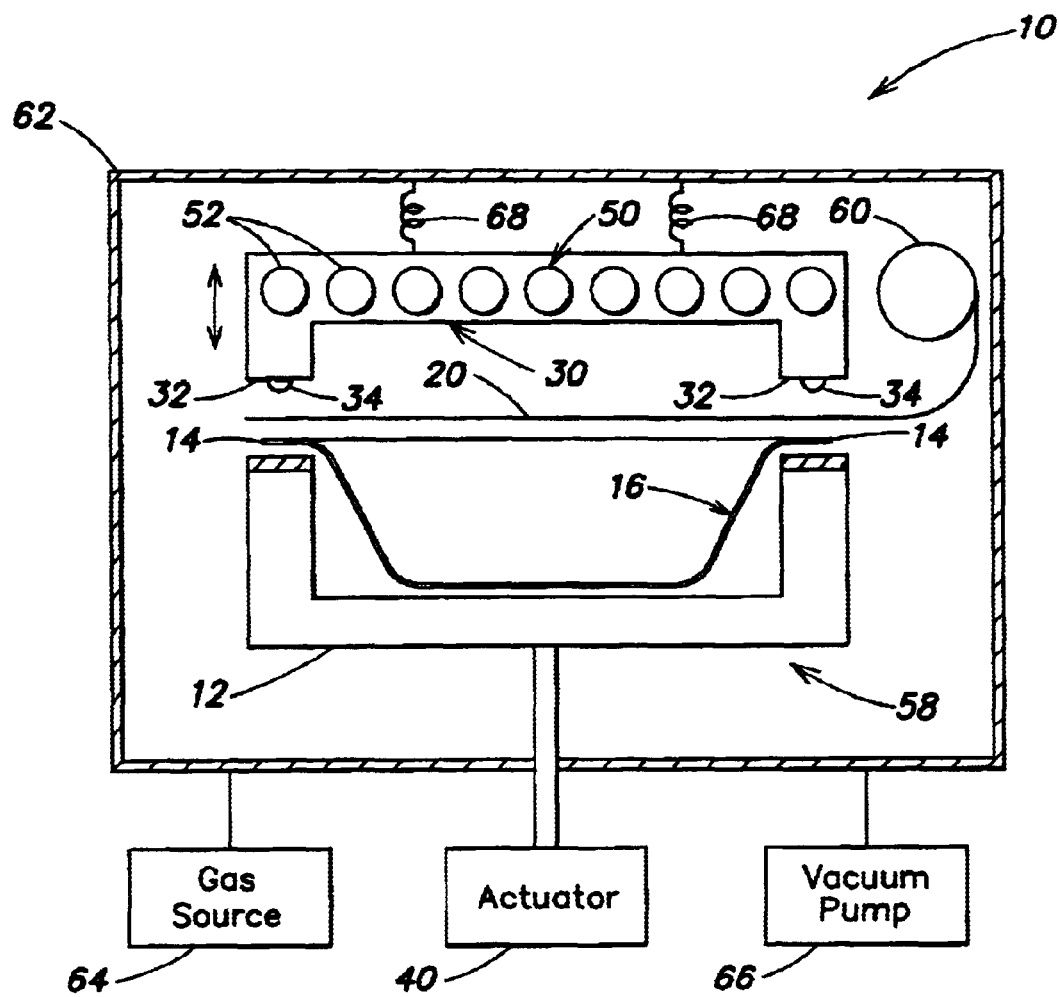
FIG. 1 is a schematic diagram of a tray sealing system in accordance with an embodiment of the invention.
Figure 2:
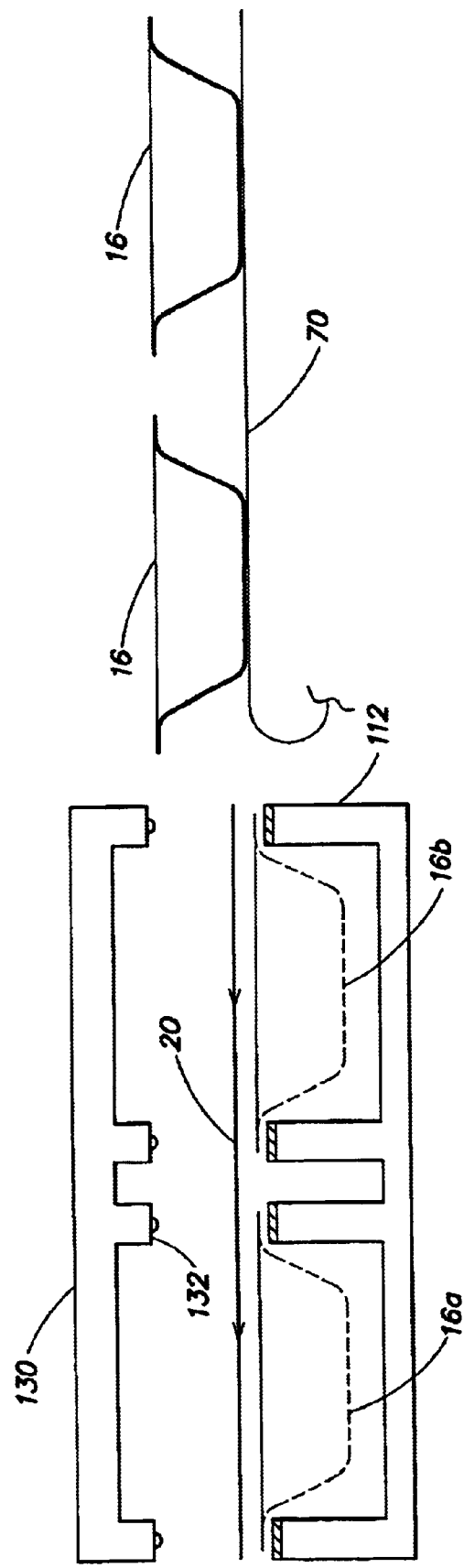
FIG. 2 is a schematic diagram showing further detail of the tray sealing system.

Embodiments of tray sealing systems in accordance with the present invention are shown schematically in FIGS. 1 and 2. Like elements in FIGS. 1 and 2 have the same reference numerals.

As shown in FIG. 1, a tray sealing system 10 includes a seal support frame 12 for supporting a flange 14 of a tray 16 during a sealing process. In the sealing process, a sealing film 20 is sealed to flange 14 to form an air-tight seal. The tray sealing system 10 further includes a seal plate 30. The seal support frame 12 is movable between a retracted position shown in FIG. 1 and a seal position in engagement with seal plate 30. As described below, seal plate 30 has a sealing surface 32 provided with a raised bead 34. An actuator 40 controls movement of seal support frame 12 between the retracted position and the seal position.

Tray sealing system 10 further includes a heater 50 for heating seal plate 30 during the sealing process. In the embodiment of FIG. 1, heater 50 comprises a series of heating elements 52 mounted within seal plate 30 and connected to a source of electrical energy (not shown). Heating elements 52 are in thermal contact with seal plate 30 so as to produce heating of sealing surface 32.

The tray sealing system 10 may further include a roll 60 of sealing film for supplying sealing film 20 during the sealing process. A sealing station 58 including seal support frame 12, seal plate 30 and heater 50 may be mounted in an enclosed chamber 62 that is connected to a gas source 64 and a vacuum pump 66. This configuration permits a gas, such as an inert gas, to be sealed within tray 16 during the sealing process.

The tray sealing system may include a single sealing station 58 for sealing one tray at a time, as shown in FIG. 1. In other embodiments, the tray sealing system may include two or more sealing stations for sealing two or more trays at a time. As shown in FIG. 2, a seal support frame 112 may accommodate trays 16a and 16b simultaneously. A seal plate 130 having a beaded sealing surface 132 is adapted for sealing trays 16a and 16b simultaneously. The tray sealing system may further include a conveyor 70 for moving trays that have been filled with food product to the sealing station.

Figure 3:
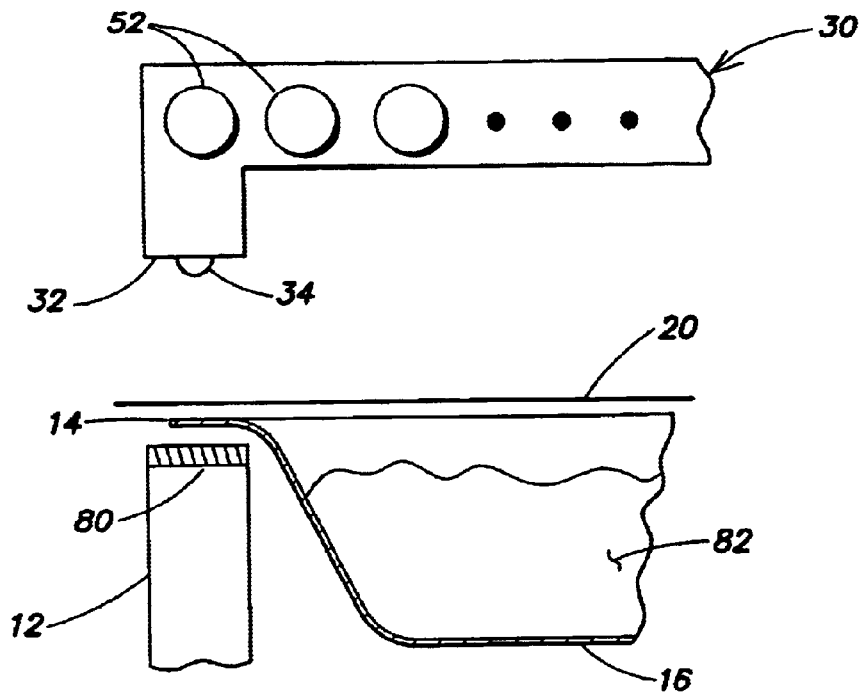
FIG. 3 is a partial cross-sectional view of the tray and sealing system, showing the seal plate in the retracted position.
Figure 4:
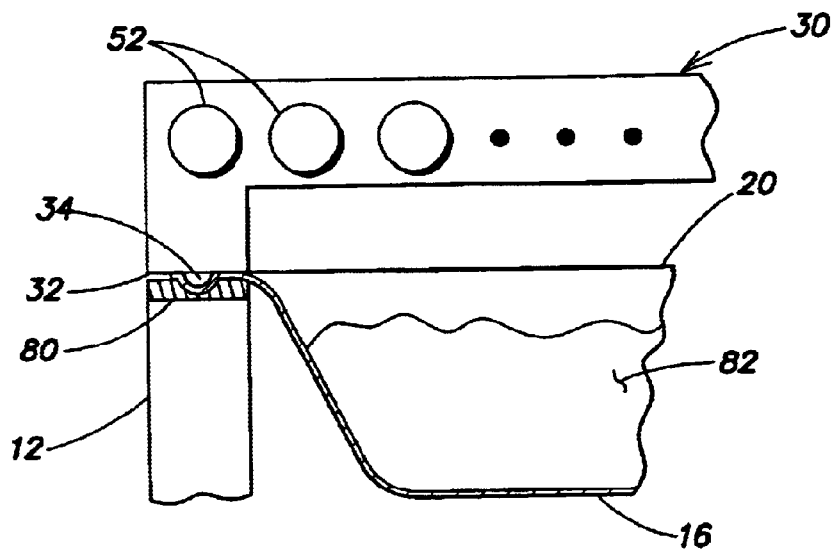
FIG. 4 is a partial cross-sectional view of the tray sealing system, showing the seal plate in the seal position.

Enlarged partial cross-sectional views of the sealing station in the retracted and seal positions are shown in FIGS. 3 and 4, respectively. Like elements in FIGS. 1, 3 and 4 have the same reference numerals. As shown, seal support frame 12 includes a gasket 80 on an upper surface for receiving flange 14 of tray 16. The gasket 80 provides flexibility for accommodating variations in tray 16 and acts as a release mechanism after sealing. In one embodiment, gasket 80 is a silicone material.

In the retracted position, a tray containing product 82 is moved into seal support frame 12. During sealing, the seal support frame 12 is moved to the seal position as shown in FIG. 4. The seal plate 30 may be mounted by springs 68 (FIG. 1) to housing 62. Springs 68 are compressed when seal support plate 12 is moved to the seal position, thereby providing a sealing force and compensating for variations in the position of seal plate 30. The raised bead 34 drives the sealing film 20 into flange 14, which, in turn, drives flange 14 into gasket 80. The relatively concentrated force produced by raised bead 34 tends to displace laterally any contaminants on flange 14, thereby providing relatively contamination-free contact between sealing film 20 and flange 14, at least along raised bead 34. The heat produced by heater 50 seals sealing film 20 to flange 16, at least along raised bead 34.

Typical trays for packing meat products are preformed of a plastic material such as polypropylene and have a variety of sizes, such as 5"×7", 7"×10", 10"×12", for example. The flange 14 is typically about 0.25 to 0.5" wide. The sealing film is typically a film which includes a resin that, when heated, transfers to the tray and seals the film to the tray. Suitable sealing films are known to those skilled in the art.

Figure 5:
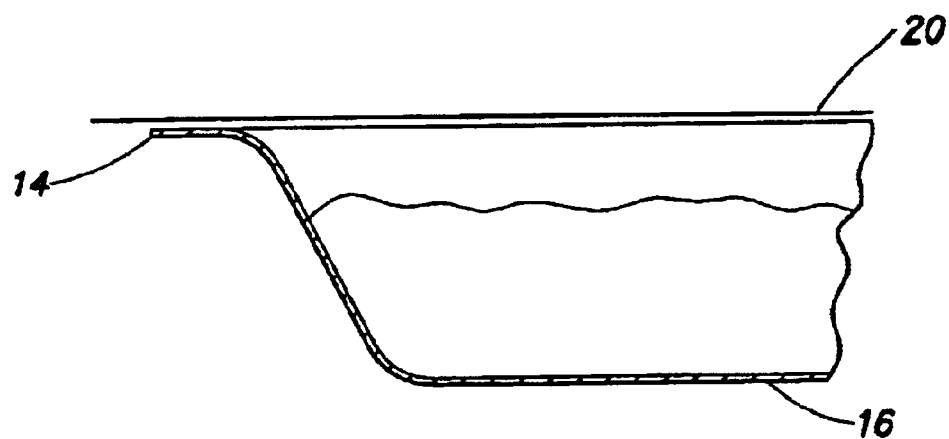
FIG. 5 is a partial cross-sectional view of a tray and sealing film prior to sealing.
Figure 6:
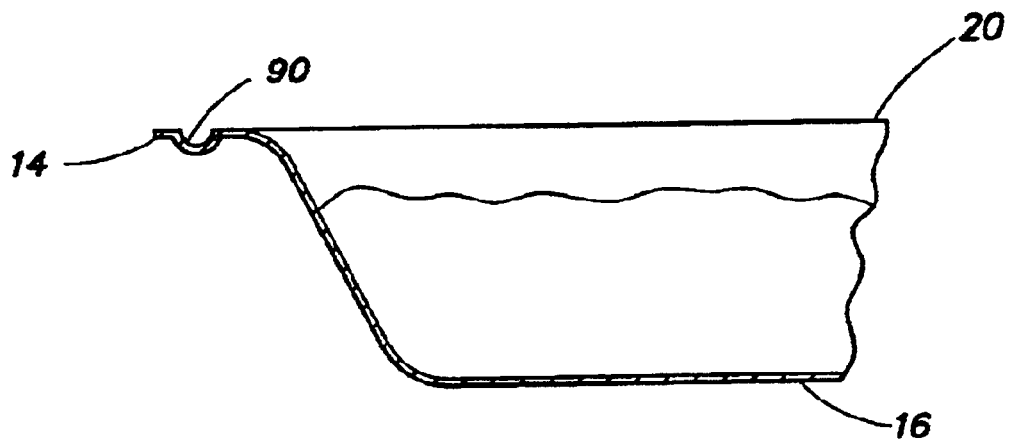
FIG. 6 is a partial cross-sectional view of the tray and sealing film after sealing.

Trays prior to and after the sealing process are shown in FIGS. 5 and 6, respectively. As indicated in FIG. 6, the raised bead 34 on sealing surface of seal plate 30 forms a groove 90 in flange 14. The sealing film 20 is pressed into groove 90 and is sealed to the bottom surface of groove 90. Any contamination is displaced laterally from groove 90 prior to sealing, thus providing a reliable and leak-free seal.

Figure 7:
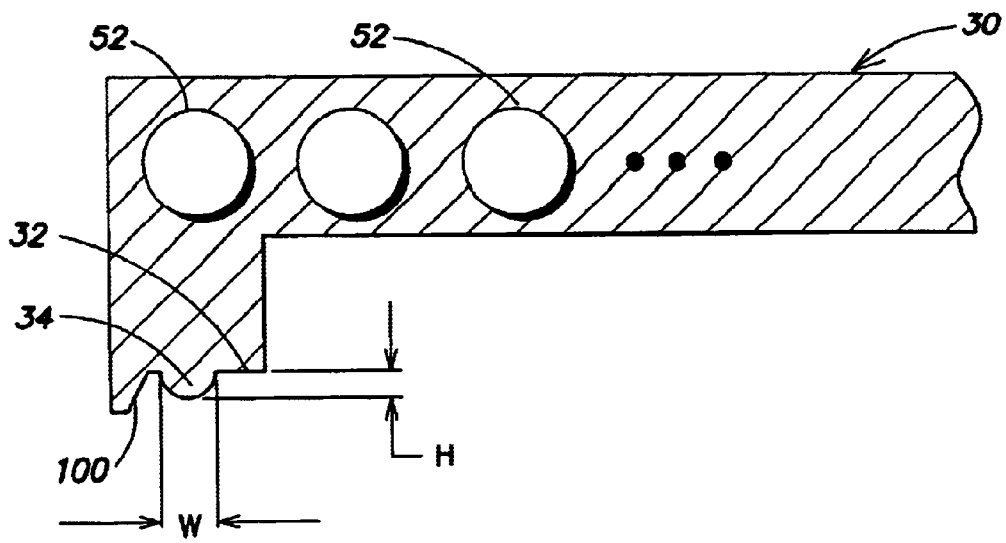
FIG. 7 is an enlarged partial cross-sectional view of an embodiment of the beaded seal plate.
Figure 8:
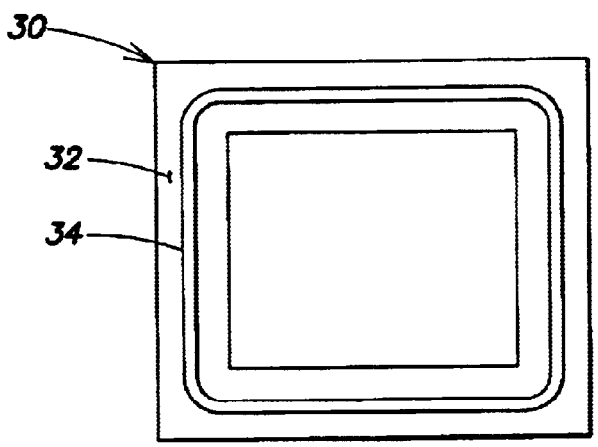
FIG. 8 is a bottom view of the seal plate, showing a raised bead in the form of a closed loop.

An enlarged, partial cross-sectional view of seal plate 30 is shown in FIG. 7. A bottom view of seal plate 30 is shown in FIG. 8. As shown in FIG. 7, sealing surface 32 may include a downwardly angled chamfer 100 around its periphery. Chamfer 100 may be configured to conform to the shape of tray flange 14, which may be flared downwardly at its outer edge. As shown in FIG. 8, raised bead 34 preferably forms a closed loop around the periphery of sealing surface 32, so as to form a continuous seal around tray flange 14. Raised bead 34 preferably has a relatively rounded cross-section or a cross-section that avoids sharp edges, so as to avoid damage to or cutting of sealing film 20. In one embodiment, raised bead 34 has a width "W" (FIG. 7) of about 3 mm and a height "H" above sealing surface 32 of about 1.5 mm.

Figure 9:
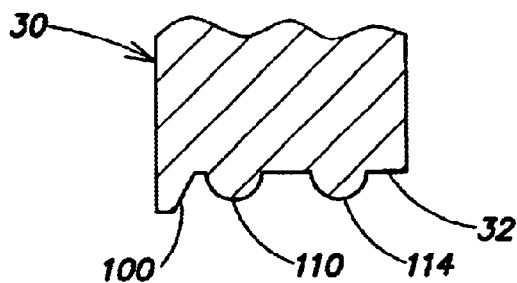
FIG. 9 is an enlarged partial cross-sectional view of a seal plate in accordance with another embodiment of the invention.

The embodiment of FIGS. 7 and 8 utilizes a single sealing bead. A second embodiment of seal plate 30 is shown in FIG. 9. In the embodiment of FIG. 9, sealing surface 32 is provided with raised beads 110 and 114, each of which forms a continuous closed loop on sealing surface 32. The embodiment of FIG. 9 produces two continuous seals around the periphery of the tray flange for redundancy and increased seal reliability. It will be understood that the sealing surface may be provided with any number of raised beads, each forming a continuous closed loop, depending upon the desired seal reliability and difficulty of sealing.

In the embodiment of FIG. 1, the seal support frame 12 is movable between the retracted position and the seal position. In general, the seal plate 30, the seal support frame 12, or both, may be movable between retracted and seal positions.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A tray sealing assembly comprising:

a seal support frame for supporting a flange of a tray during sealing of a sealing film to the flange;

a seal plate having a sealing surface provided with a raised bead, said seal support frame being movable relative to said seal plate between a retracted position and a seal position in engagement with said seal plate; and a heater for heating the seal plate, wherein said raised bead is configured to displace contaminants and to avoid damage to or cutting of the sealing film, thereby forming a seal between the sealing film and the flange at least in the region of the raised bead.

2. A tray sealing assembly as defined in claim 1 wherein said raised bead comprises a continuous closed loop on said sealing surface.

3. A tray sealing assembly as defined in claim 1 wherein said raised bead comprises a single closed loop on said sealing surface.

4. A tray sealing assembly as defined in claim 1 wherein said raised bead comprises two or more closed loops on said sealing surface.

5. A tray sealing assembly as defined in claim 1 wherein said raised bead has a rounded cross section.

6. A tray sealing assembly as defined in claim 1 wherein said raised bead has a cross section that avoids sharp edges.

7. A tray sealing assembly as defined in claim 1 wherein said raised bead has a height above said sealing surface of about 1.5 millimeters.

8. A tray sealing assembly as defined in claim 7 wherein said raised bead has a width of about 3 millimeters.

9. A tray sealing assembly as defined in claim 1 further comprising an actuator for moving said seal support frame between the seal position and the retracted position.

10. A tray sealing assembly as defined in claim 1 further comprising a source of sealing film for supplying the sealing film between the seal support frame and the seal plate.

11. A tray sealing assembly as defined in claim 1 further comprising an enclosure surrounding said seal support frame and said seal plate and a source of inert gas coupled to the enclosure, wherein the inert gas is sealed in the tray.

* * * * *